(12) United States Patent
Wu

(10) Patent No.: US 10,665,021 B2
(45) Date of Patent: May 26, 2020

(54) AUGMENTED REALITY APPARATUS AND SYSTEM, AS WELL AS IMAGE PROCESSING METHOD AND DEVICE

(71) Applicant: BOE TECHNOLOGY GROUP CO., LTD., Beijing (CN)

(72) Inventor: Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 274 days.

(21) Appl. No.: 15/536,259

(22) PCT Filed: May 20, 2016

(86) PCT No.: PCT/CN2016/082754
§ 371 (c)(1),
(2) Date: Jun. 15, 2017

(87) PCT Pub. No.: WO2017/161660
PCT Pub. Date: Sep. 28, 2017

(65) Prior Publication Data
US 2018/0061133 A1 Mar. 1, 2018

(30) Foreign Application Priority Data
Mar. 25, 2016 (CN) .......................... 2016 1 0179196

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS

2010/0164990 A1 7/2010 Van Doorn
2012/0256820 A1 10/2012 Uppuluri et al.
(Continued)

FOREIGN PATENT DOCUMENTS

CN 102866506 A 1/2013
CN 1102866506 A 1/2013
(Continued)

OTHER PUBLICATIONS

Search Report for Chinese Patent Application No. 201610179196.4 dated Oct. 8, 2016.
(Continued)

*Primary Examiner* — Jwalant Amin
(74) *Attorney, Agent, or Firm* — Calfee, Halter & Griswold LLP

(57) ABSTRACT

An augmented reality apparatus and system, an image processing method, and device are presented. The augmented reality system includes an augmented reality server and at least two augmented reality apparatuses. The augmented reality apparatuses includes first and second augmented reality apparatuses. The first augmented reality apparatus can acquire a facial image of a first user. The augmented reality server can receive the facial image of the first user, and conduct augmented reality processing on an image of a second user's surroundings sent by a second augmented reality apparatus, according to the facial image of the first user, thereby enriching the functions of the first augmented reality apparatus and enhancing the flexibility in augmented reality processing of images by the augmented reality server.

15 Claims, 7 Drawing Sheets

(51) Int. Cl.
  *G06F 3/0346* (2013.01)
  *G06K 9/00* (2006.01)
  *H04W 4/70* (2018.01)
  *G02B 27/01* (2006.01)

(52) U.S. Cl.
  CPC ............ *G06F 3/012* (2013.01); *G06F 3/0346* (2013.01); *G06K 9/00221* (2013.01); *G06K 9/00315* (2013.01); *G06K 9/00671* (2013.01); *G06T 19/00* (2013.01); *H04W 4/70* (2018.02); *G02B 2027/0138* (2013.01); *G02B 2027/0141* (2013.01)

(56) References Cited

U.S. PATENT DOCUMENTS

| | | | |
|---|---|---|---|
| 2012/0327196 A1 | 12/2012 | Ohba et al. | |
| 2013/0235078 A1 | 9/2013 | Takahashi | |
| 2014/0145914 A1* | 5/2014 | Latta | G06F 1/3215 345/8 |
| 2014/0192085 A1* | 7/2014 | Kim | G06T 19/006 345/633 |
| 2015/0070389 A1* | 3/2015 | Goto | G06T 7/00 345/633 |
| 2015/0310263 A1* | 10/2015 | Zhang | G06K 9/00315 382/103 |
| 2016/0041048 A1* | 2/2016 | Blum | G01L 1/2206 73/774 |
| 2016/0202081 A1* | 7/2016 | Debieuvre | G01C 21/20 701/523 |
| 2016/0341959 A1* | 11/2016 | Gibbs | G06K 9/00671 |
| 2016/0360970 A1* | 12/2016 | Tzvieli | G01J 5/0265 |
| 2016/0381322 A1 | 12/2016 | Wang et al. | |

FOREIGN PATENT DOCUMENTS

| | | |
|---|---|---|
| CN | 103257703 A | 8/2013 |
| CN | 103312971 A | 9/2013 |
| CN | 104571532 A | 4/2015 |
| CN | 104935866 A | 9/2015 |
| CN | 104966318 A | 10/2015 |
| CN | 105183147 A | 12/2015 |
| CN | 205430495 U | 8/2016 |
| CN | 205430995 U | 8/2016 |

OTHER PUBLICATIONS

First Office Action for Chinese Patent Application No. 201610179196.4 dated Dec. 1, 2016.
Second Office Action for Chinese Patent Application No. 201610179196.4 dated Feb. 24, 2017.
Decision of Rejection for Chinese Patent Application No. 201610179196.4 dated May 15, 2017.
Search Report for International Patent Application No. PCT/CN20161082754 dated Dec. 22, 2016.

\* cited by examiner

AUGMENTED REALITY APPARATUS AND SYSTEM, AS WELL AS IMAGE PROCESSING METHOD AND DEVICE

RELATED APPLICATIONS

The present application is the U.S. national phase entry of PCT/CN2016/082754 with an International filing date of May 20, 2016, which claims the benefit of Chinese Application No. 201610179196.4, filed on Mar. 25, 2016, the entire disclosures of which are incorporated herein by reference.

TECHNICAL FIELD

The present disclosure relates to the field of wearable apparatuses, and more particularly to an augmented reality apparatus and system, as well as an image processing method and device.

BACKGROUND ART

Augmented Reality (AR) Technology is an improved technology based on virtual reality (VR) technology. VR technology is a technology for generating an interactive 3D environment (namely, a virtual scene) on a computer by utilizing computer graphics system and various interface apparatuses, and for providing users with a sense of immersion by means of the 3D environment. AR technology can superimpose real scenes with virtual scenes in real time so as to provide users with more vivid augmented reality scenes and further improve the users' sense of immersion, wherein users feel as if they are spatially in an augmented reality scene whereby they perceive the augmented reality scene as a real scene.

In a relevant technology, users can experience an augmented reality scene by wearing an augmented reality apparatus. The augmented reality apparatus can acquire the image of a user's surroundings in real time by a camera arranged on the apparatus and send the image to an augmented reality server such that the augmented reality server can process and superpose the image of the user's surroundings with a virtual scene generated by a computer graphics system so as to generate an augmented reality scene, which will be presented to the user by a display device in the augmented reality apparatus. If there are multiple users wearing augmented reality apparatuses in the same reality scene, the images of the users' surroundings acquired by each augmented reality apparatus may further comprise images of other users.

In a relevant technology, however, the augmented reality apparatus can only acquire an image of a user's surroundings by a camera disposed outside of the apparatus. The images acquired by the augmented reality apparatus are relatively simple, such that the image processing made by the augmented reality server on the basis of the images acquired by the augmented reality apparatus is less flexible.

SUMMARY

To solve the problems in relevant technologies that images acquired by an augmented reality apparatus are simple and image processing made by an augmented reality server is less flexible, it is desired to provide an augmented reality apparatus and system, as well as an image processing method and device for solving the above problems.

According to one aspect, there is provided an augmented reality system, comprising an augmented reality server and at least two augmented reality apparatuses, the at least two augmented reality apparatuses comprising a first augmented reality apparatus and a second augmented reality apparatus, the first augmented reality apparatus comprising an apparatus body wearable by a first user; a facial image acquiring component disposed on the inside of the apparatus body, wherein when the apparatus body is worn by the first user, the facial image acquiring component is oriented towards the face of the first user and at a preset distance from the face of the first user, the facial image acquiring component is configured to acquire a facial image of the first user; and a first communication module connected with the facial image acquiring component and configured to send the facial image to the augmented reality server, the second augmented reality apparatus comprising an apparatus body wearable by a second user; a surrounding image acquiring component disposed on the outside of the apparatus body and configured to acquire an image of the second user's surroundings; and a second communication module connected with the surrounding image acquiring component and configured to send the image of the second user's surroundings to the augmented reality server, the first user and the second user being located in a same reality scene, the augmented reality server comprising a receiving module configured to receive the facial image of the first user and the image of the second user's surroundings; a processing module configured to conduct augmented reality processing on the image of the second user's surroundings according to the facial image of the first user; and a sending module configured to send the processed image of the second user's surroundings to the second augmented reality apparatus.

In an embodiment, the augmented reality server further comprises a detection sub-module configured to detect whether an image of the first augmented reality apparatus exists in the image of the second user's surroundings; and a replacement sub-module configured to replace the image of the first augmented reality apparatus with the facial image of the first user when the image of the first augmented reality apparatus exists in the image of the second user's surroundings.

In an embodiment, the first augmented reality apparatus further comprises a calibration device disposed on the outside of the apparatus body and configured to send a calibration signal for indicating the first augmented reality apparatus, the surrounding image acquiring component of the second augmented reality apparatus is further configured to detect the calibration signal, and determine, according to the calibration signal, an identification of the first augmented reality apparatus and obtain positional information of the first augmented reality apparatus in the image of the second user's surroundings, and the second communication module is configured to send the positional information and the identification of the first augmented reality apparatus corresponding to the positional information to the augmented reality server, the detection sub-module is further configured to detect whether, in the image of the second user's surroundings, the image of the augmented reality apparatus exists in the position indicated by the positional information; and determine that the image of the augmented reality apparatus in the position indicated by the positional information is the image of the first augmented reality apparatus according to the identification of the first augmented reality apparatus, when, in the image of the second user's surroundings, the image of the augmented reality apparatus exists in the position indicated by the positional information.

In an embodiment, the apparatus body of the first augmented reality apparatus is provided with an identification pattern for indicating the first augmented reality apparatus, the detection sub-module is further configured to detect whether an image of the augmented reality apparatus exists in the image of the second user's surroundings; detect whether there is the identification pattern in the image of the augmented reality apparatus, when the image of the augmented reality apparatus exists in the image of the second user's surroundings; and determine that the image of the augmented reality apparatus is the image of the first augmented reality apparatus, when there is the identification pattern in the image of the augmented reality apparatus.

In an embodiment, the first augmented reality apparatus further comprises a first motion sensor configured to acquire first motion status data of the head of the first user, and the first communication module is further configured to send the first motion status data to the augmented reality server, the second augmented reality apparatus further comprises a second motion sensor configured to acquire second motion status data of the head of the second user, and the second communication module is further configured to send the second motion status data to the augmented reality server, the augmented reality server further comprises an adjustment module configured to adjust the angle of the facial image of the first user disposed in the image of the second user's surroundings according to the first motion status data and the second motion status data.

In an embodiment, the first motion status data comprise a first deflection angle of the head of the first user in a preset reference coordinate system, the second motion status data comprise a second deflection angle of the head of the second user in a preset reference coordinate system; the adjustment module is configured to adjust the angle of the facial image of the first user disposed in the image of the second user's surroundings according to the first deflection angle and the second deflection angle.

According to another aspect, there is provided an augmented reality apparatus, comprising an apparatus body wearable by a user; a facial image acquiring component disposed on the inside of the apparatus body, wherein when the apparatus body is worn by the user, the facial image acquiring component is oriented towards the face of the user and at a preset distance from the face of the user, the facial image acquiring component is configured to acquire a facial image of the user; and a communication module connected with the facial image acquiring component and configured to send the facial image to the augmented reality server.

In an embodiment, the apparatus further comprises a calibration device disposed on the outside of the apparatus body and configured to send a calibration signal for indicating the augmented reality apparatus.

In an embodiment, the apparatus further comprises a surrounding image acquiring component disposed on the outside of the apparatus body and configured to acquire an image of the user's surroundings; and the communication module connected with the surrounding image acquiring component and further configured to send the image of the user's surroundings to the augmented reality server.

In an embodiment, the surrounding image acquiring component is further configured to detect a calibration signal sent by other augmented reality apparatus when acquiring the image of the user's surroundings, and determine, according to the detected calibration signal, an identification of the other augmented reality apparatus and obtain positional information of the other augmented reality apparatus in the image of the user's surroundings; and the communication module is configured to send the positional information and the identification of the other augmented reality apparatus corresponding to the positional information to the augmented reality server.

In an embodiment, the apparatus further comprises a motion sensor configured to acquire motion status data of the head of the user; and the communication module connected with the motion sensor and further configured to send the motion status data to the augmented reality server.

In an embodiment, the apparatus body is provided with an identification pattern for indicating the augmented reality apparatus.

In an embodiment, the facial image acquiring component comprises a wide-angle camera.

In an embodiment, the calibration device comprises an infrared transmitter.

In an embodiment, the motion sensor comprises a six-axis sensor.

In an embodiment, the apparatus body comprises glasses or a helmet.

According to another aspect, there is provided an image processing method for use in an augmented reality server, which comprises the steps of receiving a facial image of a first user sent by a first augmented reality apparatus; receiving an image of a second user's surroundings sent by a second augmented reality apparatus, the first user and the second user being located in the same reality scene; conducting augmented reality processing on the image of the second user's surroundings according to the facial image of the first user; and sending the processed image of the second user's surroundings to the second augmented reality apparatus.

In an embodiment, the step of conducting augmented reality processing on the image of the second user's surroundings according to the facial image of the first user comprises the steps of detecting whether an image of the first augmented reality apparatus exists in the image of the second user's surroundings; and replacing the image of the first augmented reality apparatus with the facial image of the first user when an image of the first augmented reality apparatus exists in the image of the second user's surroundings.

In an embodiment, the method further comprises the steps of receiving the positional information sent by the second augmented reality apparatus and the identification of the first augmented reality apparatus corresponding to the positional information, the positional information used for indicating the position of the first augmented reality apparatus in the image of the second user's surroundings; the step of detecting whether an image of the first augmented reality apparatus exists in the image of the second user's surroundings further comprises the steps of detecting whether, in the image of the second user's surroundings, the image of the augmented reality apparatus exists in the position indicated by the positional information; and determining that the image of the augmented reality apparatus in the position indicated by the positional information is the image of the first augmented reality apparatus according to the identification of the first augmented reality apparatus, when, in the image of the second user's surroundings, the image of the augmented reality apparatus exists in the position indicated by the positional information.

In an embodiment, the apparatus body of the first augmented reality apparatus is provided with an identification pattern for indicating the first augmented reality apparatus;

the step of detecting whether an image of the first augmented reality apparatus exists in the image of the second user's surroundings further comprises the steps of detecting whether an image of the augmented reality apparatus exists in the image of the second user's surroundings; detecting whether there is the identification pattern in the image of the augmented reality apparatus, when the image of the augmented reality apparatus exists in the image of the second user's surroundings; and determining that the image of the augmented reality apparatus is the image of the first augmented reality apparatus, when there is the identification pattern in the image of the augmented reality apparatus.

In an embodiment, the method further comprises the steps of receiving first motion status data of the head of the first user, sent by the first augmented reality apparatus;

receiving second motion status data of the head of the second user, sent by the second augmented reality apparatus; and adjusting the angle of the facial image of the first user disposed in the image of the second user's surroundings according to the first motion status data and the second motion status data.

In an embodiment, the first motion status data comprise a first deflection angle of the head of the first user in a preset reference coordinate system, the second motion status data comprise a second deflection angle of the head of the second user in a preset reference coordinate system; the step of adjusting the angle of the facial image of the first user disposed in the image of the second user's surroundings according to the first motion status data and the second motion status data comprises the step of adjusting the angle of the facial image of the first user disposed in the image of the second user's surroundings according to the first deflection angle and the second deflection angle.

According to another aspect, there is provided an image processing device for use in an augmented reality server, which comprises a first receiving module configured to receive a facial image of a first user sent by a first augmented reality apparatus; a second receiving module configured to receive an image of the second user's surroundings sent by a second augmented reality apparatus, the first user and the second user being located in the same reality scene; a processing module configured to conduct augmented reality processing on the image of the second user's surroundings according to the facial image of the first user; and a sending module configured to send the processed image of the second user's surroundings to the second augmented reality apparatus.

In an embodiment, the processing module further comprises a detection sub-module configured to detect whether an image of the first augmented reality apparatus exists in the image of the second user's surroundings; and a replacement sub-module configured to replace the image of the first augmented reality apparatus with the facial image of the first user when the image of the first augmented reality apparatus exists in the image of the second user's surroundings.

In an embodiment, the image processing device further comprises a third receiving module configured to receive positional information sent by the second augmented reality apparatus and the identification of the first augmented reality apparatus corresponding to the positional information, the positional information used for indicating the position of the first augmented reality apparatus in the image of the second user's surroundings; the detection sub-module is further configured to detect whether, in the image of the second user's surroundings, an image of the augmented reality apparatus exists in the position indicated by the positional information; and determine that the image of the augmented reality apparatus in the position indicated by the positional information is the image of the first augmented reality apparatus according to the identification of the first augmented reality apparatus, when, in the image of the second user's surroundings, the image of the augmented reality apparatus exists in the position indicated by the positional information. In an embodiment, the apparatus body of the first augmented reality apparatus is provided with an identification pattern for indicating the first augmented reality apparatus; the detection sub-module is further configured to detect whether an image of the augmented reality apparatus exists in the image of the second user's surroundings; detect whether there is the identification pattern in the image of the augmented reality apparatus when an image of the augmented reality apparatus exists in the image of the second user's surroundings; and determine that the image of the augmented reality apparatus is the image of the first augmented reality apparatus when there is the identification pattern in the image of the augmented reality pattern.

In an embodiment, the image processing device further comprises a fourth receiving module configured to receive first motion status data of the head of the first user sent by the first augmented reality apparatus; a fifth receiving module configured to receive second motion status data of the head of the second user sent by the second augmented reality apparatus; an adjusting module configured to adjust the angle of the facial image of the first user disposed in the image of the second user's surroundings according to the first motion status data and the second motion status data.

In an embodiment, the first motion status data comprise a first deflection angle of the head of the first user in a preset reference coordinate system, the second motion status data comprise a second deflection angle of the head of the second user in a preset reference coordinate system; the adjustment module is further configured to adjust the angle of the facial image of the first user disposed in the image of the second user's surroundings according to the first deflection angle and the second deflection angle.

The technical solutions provided by the embodiments of the present disclosure can realize at least one advantageous effect of the following advantages effects and/or other advantageous effects.

The augmented reality system provided by some embodiments comprises an augmented reality server and at least two augmented reality apparatuses, the at least two augmented reality apparatuses comprising a first augmented reality apparatus and a second augmented reality apparatus. The first augmented reality apparatus can acquire a facial image of a first user, in addition to an image of a first user's surroundings. The augmented reality server can receive the facial image of the first user, and conduct augmented reality processing on image of the second user's surroundings sent by a second augmented reality apparatus, according to the facial image of the first user, thereby enriching the functions of the first augmented reality apparatus, and enhancing the flexibility in augmented reality processing of images by the augmented reality server.

BRIEF DESCRIPTION OF DRAWINGS

To explain the technical solutions in some embodiments more clearly, the drawings to be used in the Detailed Description will be briefly introduced below. It should be realized that the following drawings are only related to some embodiments. Those skilled in the art can obtain other drawings that fall within the scope of the present invention according to these drawings without any an inventive labor.

DETAILED DESCRIPTION

To clarify the object, technical solutions and advantages of some embodiments, some implementations will be further described in detail with reference to the drawings.

Figure 1:
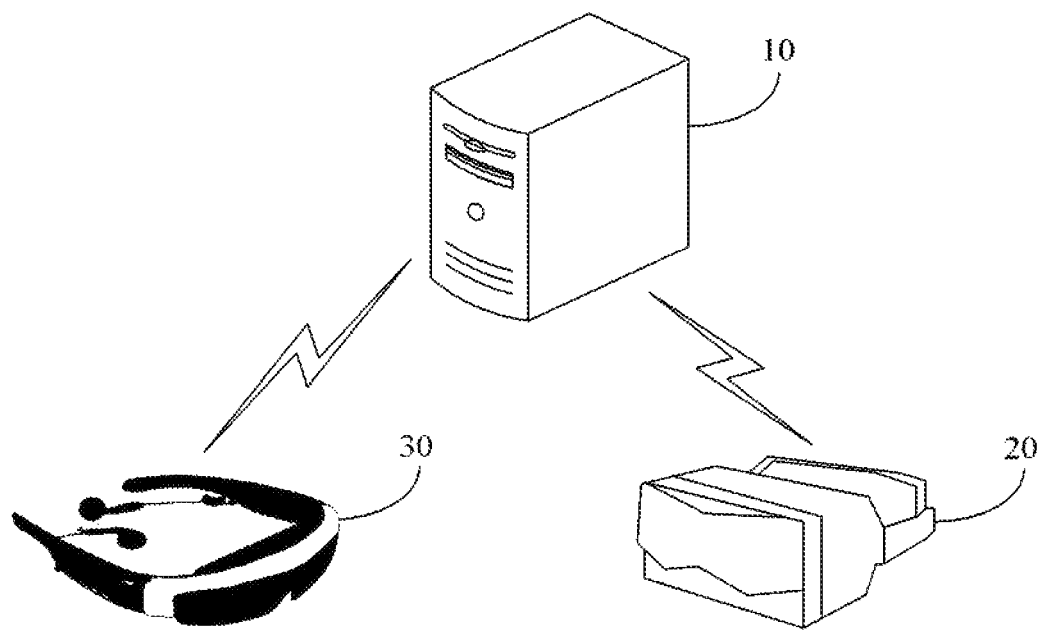
FIG. 1 is a structural schematic view of an augmented reality system according to an embodiment.

FIG. 1 is a structural schematic view of an augmented reality system according to an embodiment. With reference to FIG. 1, the system may comprise an augmented reality server 10 and two augmented reality apparatuses. The at least two augmented reality apparatuses may comprise a first augmented reality apparatus 20 and a second augmented reality apparatus 30. It should be pointed out that for the sake of conciseness, FIG. 1 only illustrates two augmented reality apparatuses. However, those ordinarily skilled in the art should know that the system may comprise more augmented reality apparatuses, and no limitation in this aspect is imposed on the present invention.

The first augmented reality apparatus 20 may acquire a facial image of a first user and send the facial image of the first user to the augmented reality server 10. The second augmented reality apparatus 30 may acquire an image of the second user's surroundings and send the image of the second user's surroundings to the augmented reality server 10. The first user and the second user are located in the same reality scene. As to the specific structures of the first augmented reality apparatus 20 and the second augmented reality apparatus 30, their specific implementation will be described in detail with reference to FIG. 2.

The augmented reality server 10 may receive the facial image of the first user and the image of the second user's surroundings, conduct augmented reality processing on the image of the second user's surroundings according to the facial image of the first user, and send the processed image of the second user's surroundings to the second augmented reality apparatus 30. As to the specific structure of the augmented reality server 10, a specific implementation thereof will be described in detail with reference to FIG. 5.

In summary, there is provided an augmented reality system according to some embodiments. The system comprises an augmented reality server and at least two augmented reality apparatuses, the at least two augmented reality apparatuses comprising a first augmented reality apparatus and a second augmented reality apparatus, wherein the first augmented reality apparatus can acquire a facial image of a first user, in addition to an image of a first user's surroundings. The augmented reality server can receive the facial image of the first user, and conduct augmented reality processing on image of the second user's surroundings sent by a second augmented reality apparatus, according to the facial image of the first user, thereby enriching the functions of the first augmented reality apparatus, and enhancing the flexibility in augmented reality processing of images by the augmented reality server.

Figure 2A:
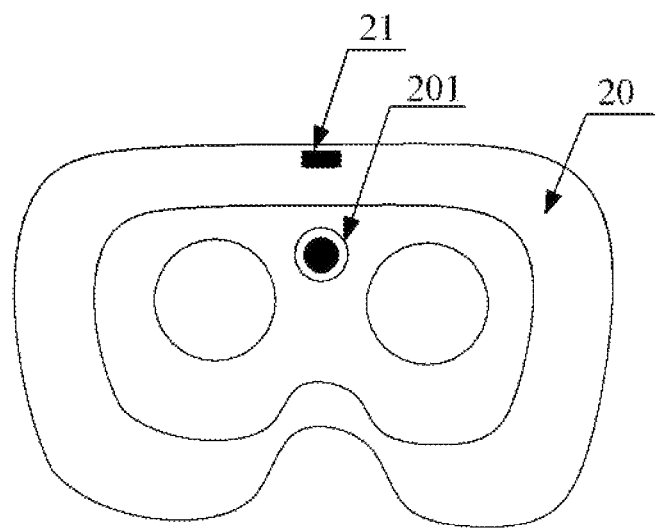
FIG. 2A is a structural block diagram illustrating the inside of the augmented reality apparatus according to an embodiment.

FIG. 2A is a structural block diagram illustrating the inside of the augmented reality apparatus according to an embodiment. The augmented reality apparatus may be applied in the augmented reality system as shown in FIG. 1. As shown in FIG. 2A, the augmented reality apparatus may comprise an apparatus body 20 wearable by a user and a communication module 21. The augmented reality apparatus may further comprise a facial image acquiring component 201 disposed on the inside of the apparatus body 20. When the apparatus body is worn by the user, the facial image acquiring component 201 is oriented towards the face of the user and at a preset distance from the face of the user (namely, not in direct contact with the face of the user), the facial image acquiring component 201 is configured to acquire a facial image of the user. The communication module 21 is connected with the facial image acquiring component 201 and configured to send the facial image to the augmented reality server.

In summary, there is provided an augmented reality apparatus according to some embodiments. The apparatus body of the augmented reality apparatus is provided on the inside with a facial image acquiring component capable of acquiring a facial image of a user, so that the augmented reality apparatus can send the facial image to the augmented reality server by the communication module, thereby increasing the types of images being acquirable by the augmented reality apparatus, enriching the functions of the augmented reality apparatus and enhancing the use flexibility of the augmented reality apparatus.

It needs to be explained that in some embodiments, the apparatus body 20 may be glasses or helmet for easy wearing by the user. The facial image acquiring component 201 may be a wide-angle camera. The wide-angle camera provides a wide view so that it can effectively acquire the facial image of a user when it is very close to the user's face. The communication module 21 may be a Bluetooth module, wireless fidelity (WiFi) module or network interface. The communication module can be connected with the facial image acquiring component via a processor in the augmented reality apparatus, or be electrically connected with the facial image acquiring component directly, which will not be limited herein.

Figure 2B:
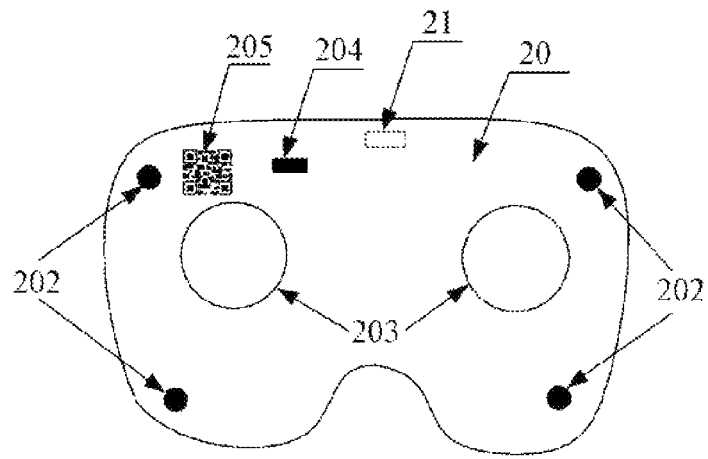
FIG. 2B is a structural block diagram illustrating the outside of the augmented reality apparatus according to an embodiment.

FIG. 2B is a structural block diagram illustrating the outside of the augmented reality apparatus according to an embodiment. As shown in FIG. 2B, the augmented reality apparatus may further comprise a calibration device 202. The calibration device 202 is disposed on the outside of the apparatus body 20 and configured to send a calibration signal for indicating the augmented reality apparatus.

In some embodiments, the calibration device 202 may be an infrared transmitter. On the outside of the apparatus body 20, there may be disposed a plurality of calibration devices which can be arranged along the external contour of the apparatus body so as to indicate the augmented reality apparatus and the position thereof to other augmented reality apparatus by a calibration signal sent from each calibration device. Exemplarily, as shown in FIG. 2B, on the outside of the apparatus body 20 can be disposed four infrared transmitters 202, which are respectively disposed at four corners of the apparatus body 20. The four infrared transmitters 202 may transmit calibration signals (infrared signals in this example) that can be modulated with an identification of the augmented reality apparatus. When other augmented reality apparatus detect the infrared signals by a surrounding image acquiring component (e.g., a camera), the position of the augmented reality apparatus can be determined, and the infrared signals can be demodulated to determine the identification of the augmented reality apparatus.

Furthermore, as shown in FIG. 2B, the augmented reality apparatus may further comprise a surrounding image acquiring component 203. The surrounding image acquiring component 203 is disposed on the outside of the apparatus body 20 for acquiring the image of the user's surroundings. The communication module 21 is connected with the surrounding image acquiring component 203 and further used for sending the image of the user's surroundings to the augmented reality server. Exemplarily, in some embodiments, the surrounding image acquiring component 203 may be a camera. In an embodiment, two cameras can be symmetrically arranged on the outside of the apparatus body 20, and the two cameras can be arranged in the positions outside of the apparatus body which correspond to the user's eyes so as to simulate human vision more vividly.

In addition, the surrounding image acquiring component 203 may further detect the calibration signal sent out by other augmented reality apparatus when acquiring the image of the user's surroundings, determine the identification of the other augmented reality apparatus according to the detected calibration signal, and obtain the positional information of the other augmented reality apparatus in the image of the user's surroundings. The communication module 21 may further send the positional information and the identification of the other augmented reality apparatus corresponding to the positional information to the augmented reality server.

In some embodiments, the positional information of the other augmented reality apparatus in the image of the user's surroundings may be the coordinates of the calibration signal transmitting point in the image of the user's surroundings. If an augmented reality apparatus transmits a plurality of calibration signals, the surrounding image acquiring component can respectively obtain the coordinates of each calibration signal transmitting point in the image of the user's surroundings. If the image of the user's surroundings comprises a plurality of calibration signals transmitted by a plurality of other augmented reality apparatuses, the surrounding image acquiring component may establish a correspondence relationship between the positional information and the identification of the augmented reality apparatus according to the indication of the augmented reality apparatus by each calibration signal.

In an embodiment, as shown in FIG. 2B, the augmented reality apparatus may further comprise a motion sensor 204 for acquiring the motion status data of the head of the user. The communication module 21 is connected with the motion sensor 204 and may further send the motion status data to the augmented reality server. The motion sensor 204 may be a six-axis sensor, which may comprise a three-axis accelerator and a three-axis gyroscope, wherein the three-axis accelerator can detect the acceleration of the augmented reality apparatus in a horizontal direction, and the three-axis gyroscope can detect the rotational angle of the augmented reality apparatus. The six-axis sensor may acquire the motion status data of the head of the user in real time, the motion status data may comprise a deflection angle of the head of the user in a preset reference coordinate system, and the preset reference coordinate system may be a reference coordinate system of the motion sensor. After the communication module sends the motion status data to the augmented reality server, the augmented reality server may process the augmented reality image according to the deflection angle of the head of the user in the preset reference coordinate system, which enhances of the flexibility in processing the augmented reality image.

In an embodiment, as shown in FIG. 2B, the apparatus body 20 may further be provided with an identification pattern 205 for indicating the augmented reality apparatus. The identification pattern may be a pattern formed by particular geometrical graphs in a preset format, such as a QR code or graphic code. The identification pattern can uniquely identify the augmented reality apparatus. When the image of the user's surroundings acquired by the other augmented reality apparatus includes the identification pattern, and is sent to the augmented reality server, the augmented reality server can determine the augmented reality apparatus corresponding to the identification pattern according to the identification pattern.

In summary, an augmented reality apparatus is provided according to some embodiments. The apparatus body of the augmented reality apparatus is provided on the inside with a facial image acquiring component. The facial image acquiring component can acquire the facial image of the user, so that the augmented reality apparatus can send the facial image to the augmented reality server by the communication module, which increases the types of images being acquirable by the augmented reality apparatus, enriches the functions of the augmented reality apparatus and enhances the use flexibility of the augmented reality apparatus.

Figure 3:
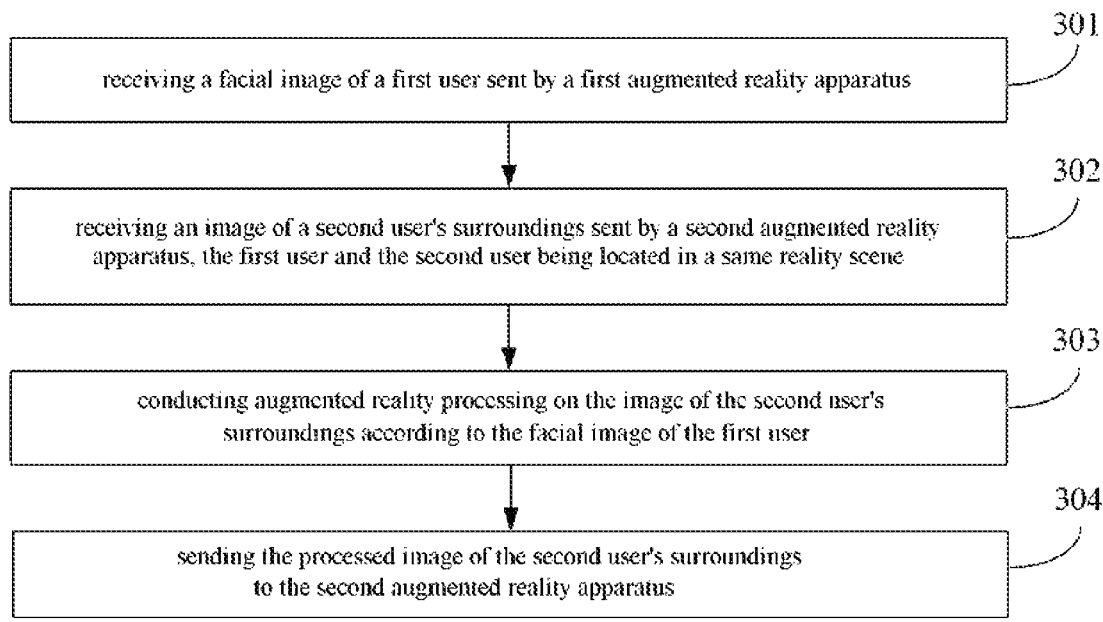
FIG. 3 is a flow chart of an image processing method according to an embodiment of the present invention.

FIG. 3 is a flow chart of an image processing method according to an embodiment, which can be applied in the augmented reality server shown in FIG. 1. As shown in FIG. 3, the method may comprise the steps of:

Step 301: receiving a facial image of a first user sent by a first augmented reality apparatus;

Step 302: receiving an image of a second user's surroundings sent by a second augmented reality apparatus, the first user and the second user being located in the same reality scene;

Step 303: conducting augmented reality processing on the image of a second user's surroundings according to the facial image of the first user; and Step 304: sending the processed image of a second user's surroundings to the second augmented reality apparatus.

In summary, an image processing method is provided according to some embodiments. The augmented reality server can receive a facial image of a first user sent by a first augmented reality apparatus and conduct augmented reality processing on the image of a second user's surroundings received from the second augmented reality apparatus according to the facial image of the first user, which enhances the flexibility in augmented reality processing of the images by the augmented reality server.

Figure 4A:
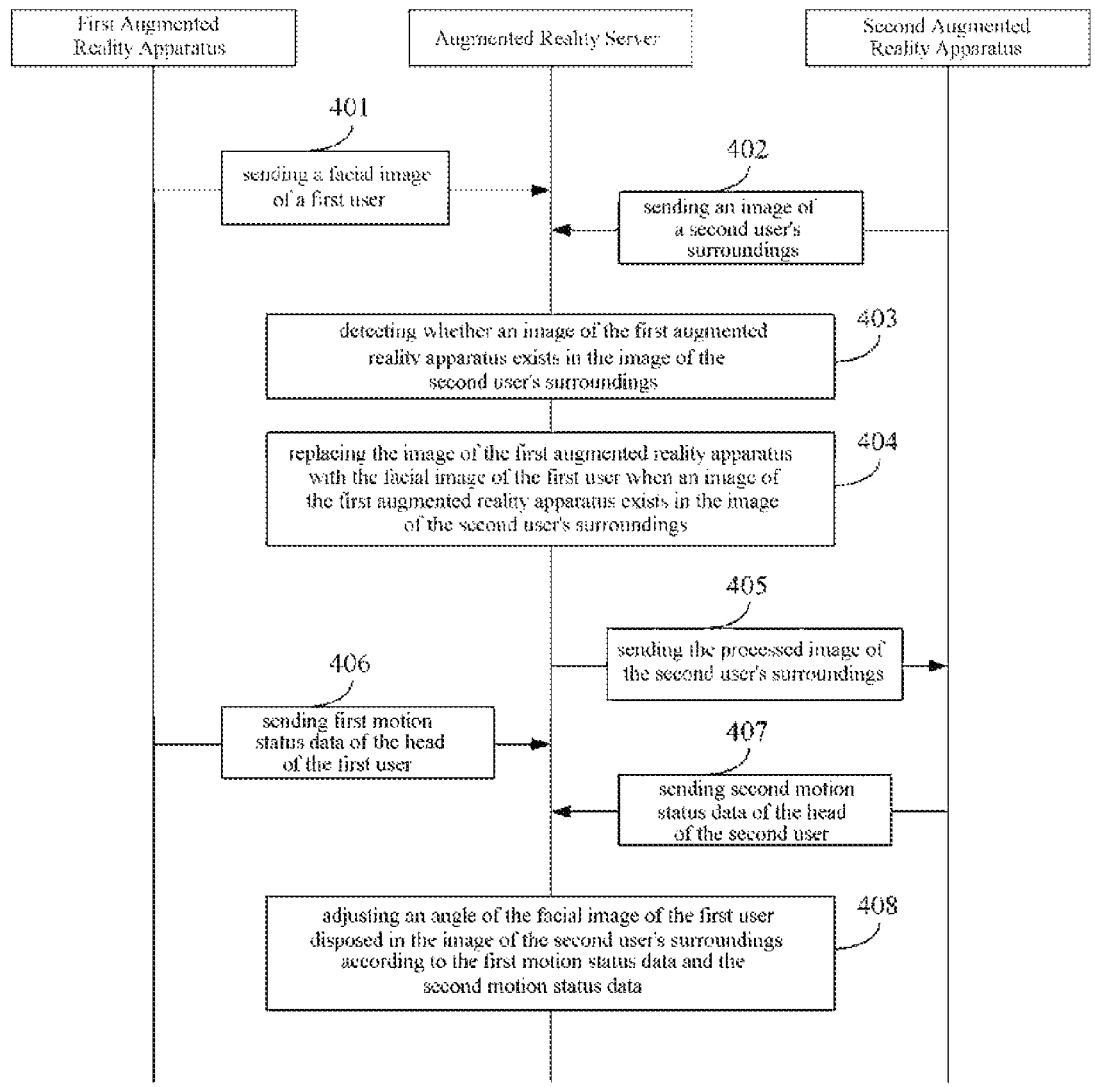
FIG. 4A is a flow chart of another image processing method according to an embodiment.
Figure 4B:
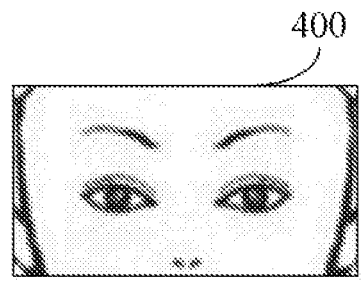
FIG. 4B is a schematic view of a facial image of a first user acquired by a first augmented reality apparatus according to an embodiment.

FIG. 4A is a flow chart of another image processing method according to an embodiment, which can be applied in the augmented reality system shown in FIG. 1. As shown in FIG. 4A, the method may comprise Step 401: sending a facial image of a first user to an augmented reality server by a first augmented reality apparatus. In some embodiments, with reference to FIG. 2A, the apparatus body of the first augmented reality apparatus may be provided on the inside with a facial image acquiring component. When the apparatus body is worn by the first user, the facial image acquiring component is oriented towards the face of the first user and at a preset distance from the face of the first user, the facial image acquiring component is configured to acquire a facial image of the first user. The first augmented reality apparatus may further comprise a communication module and it may send the facial image of the first user to the augmented reality server by the communication module. Exemplarily, the image acquiring component disposed on the inside of the apparatus body of the first augmented reality apparatus may be a wide-angle camera. The facial image 400 of the first user acquired by the first augmented reality apparatus through the wide-angle camera is shown in FIG. 4B.

Figure 4C:
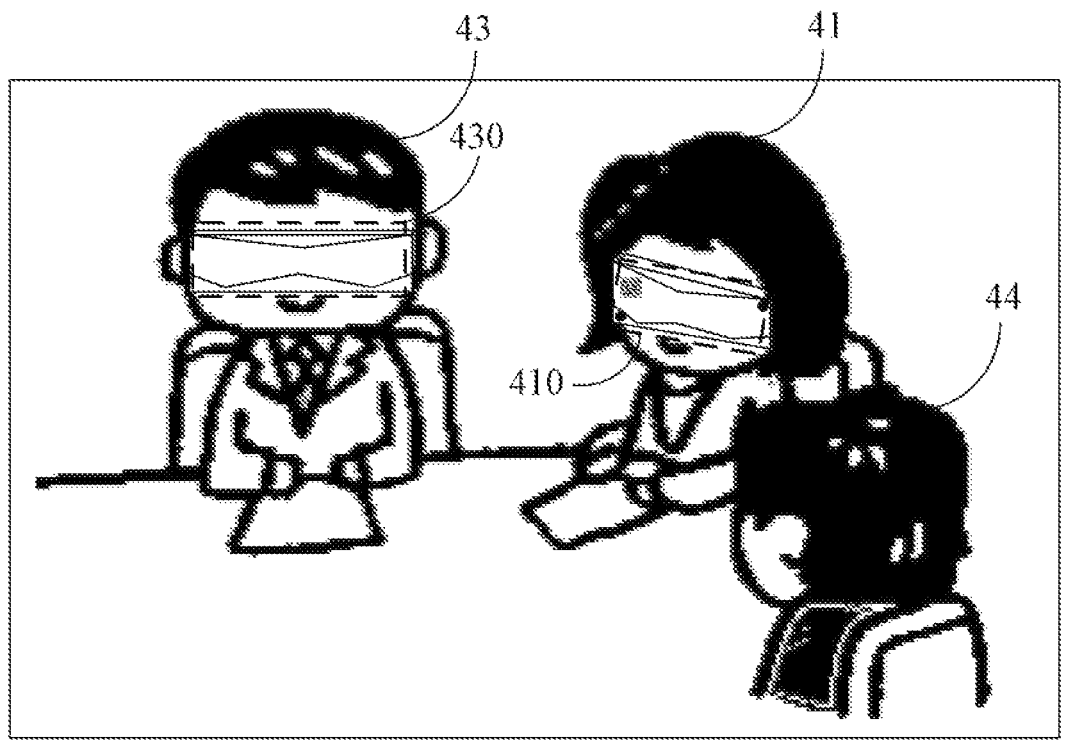
FIG. 4C is a schematic view of an image of a second user's surroundings acquired by a second augmented reality apparatus according to an embodiment.

The method then moves on to Step 402: sending an image of a second user's surroundings to an augmented reality server by a second augmented reality apparatus. The image of a second user's surroundings is acquired by the second augmented reality apparatus, and the first user and the second user are located in the same reality scene. In some embodiments, a surrounding image acquiring component (e.g., a camera) may be disposed on the outside of the apparatus body of the second augmented reality apparatus, and the surrounding image acquiring component can acquire the image of a second user's surroundings. The second augmented reality apparatus may further be provided therein with a communication module, and it may send the image of a second user's surroundings to the augmented reality server by the communication module. Exemplarily, as shown in FIG. 4C, it is assumed that the second user (not shown in FIG. 4C) is having a virtual meeting with a first user 41, a third user 43 and a fourth user 44 in a meeting room, and each user wears an augmented reality apparatus connected with the same augmented reality server, the image of a second user's surroundings acquired by the second augmented reality apparatus worn by the second user is shown in FIG. 4C.

Then, the method moves on to Step 403: the augmented reality server detecting whether an image of the first augmented reality apparatus exists in the image of a second user's surroundings. After the augmented reality server receives the facial image of the first user and the image of a second user's surroundings, it may first detect whether an image of the first augmented reality apparatus exists in the image of a second user's surroundings so as to process the image of a second user's surroundings according to the facial image of the first user. The procedure of detecting the image of the first augmented reality apparatus can be realized in two manners, which are respectively illustrated in the flow charts shown in FIG. 4D and FIG. 4E.

Figure 4D:
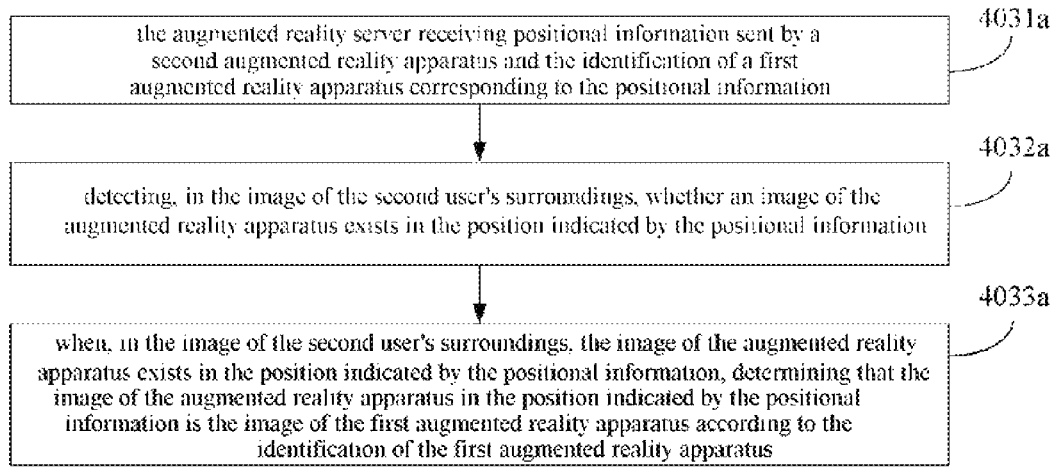
FIG. 4D is a flow chart of a method for detecting whether there is an image of the first augmented reality apparatus by an augmented reality server according to an embodiment.

As a first implementing manner, FIG. 4D shows a flow chart of a method for detecting whether an image of the first augmented reality apparatus exists in the image of a second user's surroundings by an augmented reality server.

At first, in Step 4031a, the augmented reality server receives positional information sent by a second augmented reality apparatus and the identification of a first augmented reality apparatus corresponding to the positional information.

The positional information is used to indicate the position of the first augmented reality apparatus in the image of a second user's surroundings. When acquiring the image of the second user's surroundings by a surrounding image acquiring component, the second augmented reality apparatus may further detect a calibration signal sent by other augmented reality apparatus (e.g., the first augmented reality apparatus), which signal is used for indicating the other augmented reality apparatus. For example, the calibration signal may be modulated with an identification of the other augmented reality apparatus. Thus, the second augmented reality apparatus may obtain the positional information of the other augmented reality apparatus in the image of the second user's surroundings according to the detected calibration signal, and then demodulate the calibration signal to further determine the identification of the other augmented reality apparatus corresponding to the positional information. When the second augmented reality apparatus detects the calibration signal of the first augmented reality apparatus, it can send to the augmented reality server the obtained positional information of the first augmented reality apparatus in the image of the second user's surroundings, and the identification of the first augmented reality apparatus corresponding to the positional information. Exemplarily, it is assumed that the first user 41 in FIG. 4C wears the first augmented reality apparatus, which is provided with two calibration devices, the positional information of the first augmented reality apparatus in the image of the second user's surroundings, as obtained by the second augmented reality apparatus according to the calibration signals sent by the two calibration devices, are the coordinates of two calibration signal transmitting points. For example, the positional information may be (1.5, 0.8) and (1.65, 0.86). The second augmented reality apparatus may further obtain the identification of the first augmented reality apparatus according to the two calibration signals, e.g., 001. Moreover, since the third augmented reality apparatus worn by the third user 43 may also send a calibration signal, the second augmented reality apparatus may also obtain the positional information of the third augmented reality apparatus in the image of the second user's surroundings: (1.3, 0.85) and (1.5, 0.92), and the identification of the third augmented reality apparatus corresponding to the positional information: 003. Therefore, the second augmented reality apparatus may send the correspondence relationship between the positional information and the identification of the augmented reality apparatus as shown in Table 1 to the augmented reality server.

TABLE 1

| Identification of Augmented Reality Apparatus | 001 | 003 |
|---|---|---|
| Positional Information | (1.5, 0.8); (1.65, 0.86) | (1.3, 0.85); (1.5, 0.92) |

Then the method moves on to Step 4032a: detect, in the image of the second user's surroundings, whether an image of the augmented reality apparatus exists in the position indicated by the positional information. After the augmented reality server determines the position of the first augmented reality apparatus in the image of the second user's surroundings according to the positional information, it can detect whether an image of the augmented reality apparatus exists in the position. To be specific, the augmented reality server may store an apparatus pattern template. The augmented reality server may obtain the image in the position indicated by the positional information and then compare the image with the apparatus pattern template. If the image in the position indicated by the positional information matches the apparatus pattern template, the augmented reality server may determine that an image of the augmented reality apparatus exists in the position indicated by the positional information. Exemplarily, it is assumed that the image of the second user's surroundings is shown in FIG. 4C and the correspondence relationship between the positional information obtained by the augmented reality server and the identification of the augmented reality apparatus is shown in Table 1, the positional information corresponding to the first augmented reality apparatus 001 is (1.5, 0.8), (1.65, 0.86). The augmented reality server may take the two coordinates as the end points of the diagonals of a rectangle, and compare an image 410 in the area surrounded by the rectangle with the apparatus pattern template. If the image 410 in the area surrounded by the rectangle matches the apparatus pattern template, it can be determined that an image of the augmented reality apparatus exists in the position indicated by the positional information.

Then the method moves on to Step 4033a: when, in the image of the second user's surroundings, the image of the augmented reality apparatus exists in the position indicated by the positional information, it can be determined that the image of the augmented reality apparatus in the position indicated by the positional information is the image of the first augmented reality apparatus according to the identification of the first augmented reality apparatus. Since the identification of the augmented reality apparatus corresponding to the positional information is the identification of the first augmented reality apparatus, when, in the image of the second user's surroundings, the image of the augmented reality apparatus exists in the position indicated by the positional information, the augmented reality server may determine that the image of the augmented reality apparatus in the position indicated by the positional information is the image of the first augmented reality apparatus. Exemplarily, the augmented reality server can determine that the image 410 of the augmented reality apparatus in the position indicated by the positional information (1.5, 0.8), (1.65, 0.86) is the image of the first augmented reality apparatus.

Figure 4E:
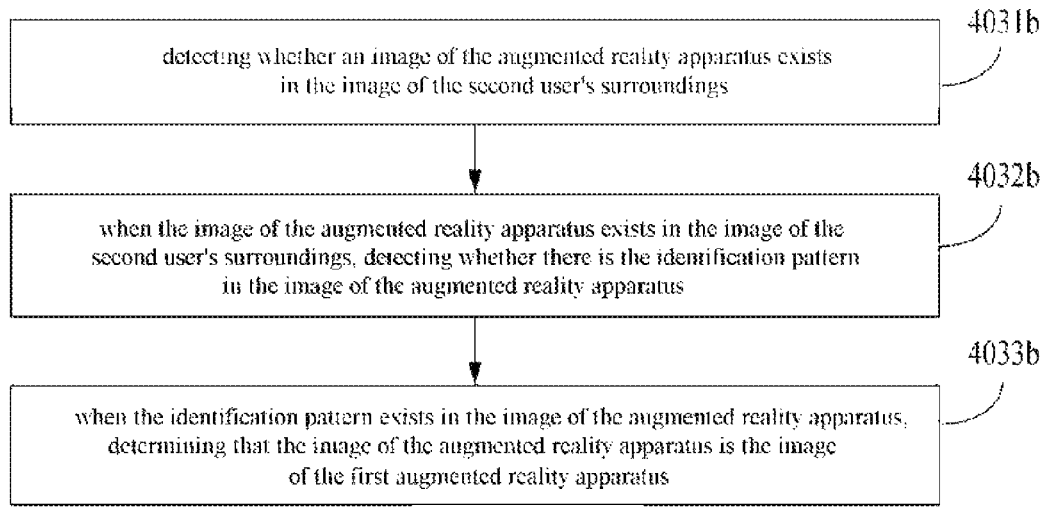
FIG. 4E is a flow chart of another method for detecting whether there is an image of the first augmented reality apparatus by an augmented reality server according to an embodiment.

In the second implementing manner, the apparatus body of the first augmented reality apparatus may be provided with an identification pattern for indicating the first augmented reality apparatus, and the identification pattern may uniquely indicate the first augmented reality apparatus. FIG. 4E shows a second manner to implement a method for detecting whether an image of the first augmented reality apparatus exists in the image of the second user's surroundings by the augmented reality server.

At first, in the step 4031b: detecting whether an image of the augmented reality apparatus exists in the image of the second user's surroundings. After the augmented reality server receives the image of the second user's surroundings, it may also conduct detection in the image of the second user's surroundings and judge whether an image of the augmented reality apparatus matching the apparatus pattern template exists in the image of the second user's surroundings. Exemplarily, it is assumed that the image of the second user's surroundings received by the augmented reality server is shown in FIG. 4C, the augmented reality server can, after detecting the image, determine images 410 and 430 of two augmented reality apparatuses exist in the image of the second user's surroundings, wherein 410 is the image of the first augmented reality apparatus worn by the first user 41 and 430 is the image of the third augmented reality apparatus worn by the third user 43.

Then, in Step 4032b, when the image of the augmented reality apparatus exists in the image of the second user's surroundings, detecting whether there is the identification pattern in the image of the augmented reality apparatus. In some embodiments, the augmented reality server may store the correspondence relationship between the identification of the augmented reality apparatus and the identification pattern. When the image of the augmented reality apparatus exists in the image of the second user's surroundings, the augmented reality server may determine the identification pattern corresponding to the first augmented reality apparatus according to the correspondence relationship between the augmented reality apparatus and the identification pattern, and detect whether the identification pattern corresponding to the first augmented reality apparatus exists in the image of the augmented reality apparatus which is in the image of the second user's surroundings. Alternatively, the identification pattern may be encoded with an identification of the augmented reality apparatus. When the augmented reality server detects an identification pattern exists in the image of the second user's surroundings, it can decode the identification pattern and obtain the identification of the augmented reality apparatus corresponding to the identification pattern, and then judge whether the identification of the augmented reality apparatus corresponding to the identification pattern is the identification of the first augmented reality apparatus.

Exemplarily, it is assumed that the identification pattern corresponding to the identification 001 of the first augmented reality apparatus, which is stored in the augmented reality server, is the identification pattern 205 in FIG. 2B, and when the augmented reality server detects the images 410 and 430 of the augmented reality apparatuses in the image of the second user's surroundings, it may continue to detect whether the identification pattern 205 as shown in FIG. 2B exists in the images of the two augmented reality apparatuses. Alternatively, the augmented reality server may also directly conduct detection on the images 410 and 430 of the two augmented reality apparatuses. When an identification pattern is detected in either of the images of the augmented reality apparatus, the identification pattern will be decoded to obtain the identification of the augmented reality apparatus corresponding to the identification pattern, thereby determining whether the identification pattern is the one corresponding to the first augmented reality apparatus.

Then, in Step 4033b, when the identification pattern exists in the image of the augmented reality apparatus, determining that the image of the augmented reality apparatus is the image of the first augmented reality apparatus.

Exemplarily, when the augmented reality server detects an identification pattern 205 corresponding to the first augmented reality apparatus in the image 410 of the augmented reality apparatus, the augmented reality server can determine that the image 410 of the augmented reality apparatus is the image of the first augmented reality apparatus.

Then, the method moves on to Step 404: when the image of the first augmented reality apparatus exists in the image of the second user's surroundings, the augmented reality server replaces the image of the first augmented reality apparatus with the facial image of the first user. In the procedure during which the augmented reality server conducts augmented reality processing on the image of the second user's surroundings, if it is detected that the image of the first augmented reality apparatus exists in the image of the second user's surroundings, the image of the first augmented reality apparatus may be replaced with the facial image of the first user. That is, according to a preset image superposition algorithm, the facial image of the first user is superposed onto the image of the first augmented reality apparatus. Reference can be made to relevant technologies for specifically superposing the facial image according to the preset image superposition algorithm, which will not be discussed herein.

Figure 4F:
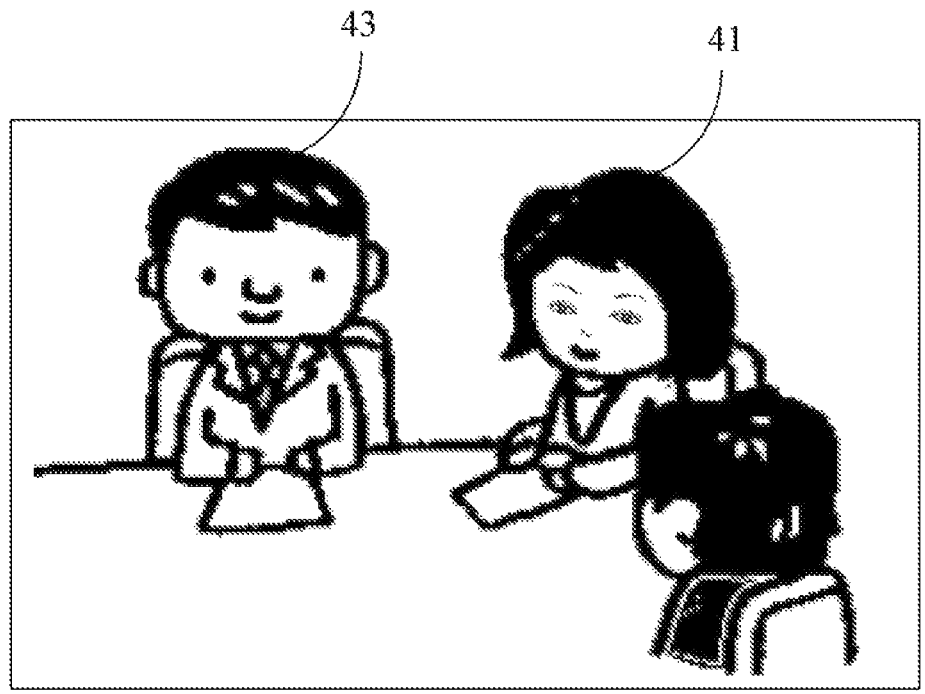
FIG. 4F is a schematic view of the image of the second user's surroundings processed by augmented reality processing according to an embodiment.

Exemplarily, when the augmented reality server detects the image 410 of the first augmented reality apparatus in the image of the second user's surroundings as shown in FIG. 4C, the augmented reality server may replace the image 410 of the first augmented reality apparatus in FIG. 4C with the facial image 400 of the first user shown in FIG. 4B. Similarly, in FIG. 4C, the third augmented reality apparatus 430 worn by the third user 43 may also send the acquired facial image of the third user 43 to the augmented reality server, such that the augmented reality server can replace the image 430 of the third augmented reality apparatus in the image of the second user's surroundings with the facial image of the third user 43. The effect achieved by processing the image of the second user's surroundings by the augmented reality server according to the received facial image is shown in FIG. 4F. It can be seen from FIG. 4F that in the processed image of the second user's surroundings, the facial images of the first user 41 and the third user 43 are shown completely without being shielded by the augmented reality apparatus. The processed augmented reality image has a better display effect, which improves the users' sense of immersion in the augmented reality scene.

Later, in Step 405, the augmented reality server sends the processed image of the second user's surroundings to the second augmented reality apparatus. In some embodiments, after the augmented reality server processes the image of the second user's surroundings according to the facial image of the first user, it may also process and superpose the processed image of the second user's surroundings with the virtual scene generated by a graphic system, so as to obtain an augmented reality image, and send the augmented reality image to the second augmented reality apparatus. The second augmented reality apparatus may be provided on the inside with a display device, through which the second user can view the augmented reality image.

Further, in Step 406, the first augmented reality apparatus sends first motion status data of the head of the first user to the augmented reality server. In some embodiments, the first augmented reality apparatus may also be provided therein with a motion sensor, through which the first augmented reality apparatus can acquire the first motion status data of the head of the first user in real time and send the acquired first motion status data to the augmented reality server by a communication module in real time, wherein the first motion status data may comprise a deflection angle of the head of the first user in a preset reference coordinate system, and the preset reference coordinate system may be a reference coordinate system of the motion sensor.

Further, in Step 407, the second augmented reality apparatus sends second motion status data of the head of the second user to the augmented reality server. Similarly, the second augmented reality apparatus may also be provided therein with a motion sensor. The second augmented reality apparatus may also send the second motion status data of the head of the second user to the augmented reality server in real time, wherein the second motion status data may comprise a deflection angle of the head of the second user in a preset reference coordinate system.

It shall be explained that in actual application, if a plurality of augmented reality apparatuses are located in the same augmented reality system, the motion sensors in the plurality of augmented reality apparatuses when acquiring motion status data may be based on the same preset reference coordinate system, so that the augmented reality server can process the motion status data sent by those augmented reality apparatuses.

Next, in Step 408, the augmented reality server adjusts the angle of the facial image of the first user disposed in the image of the second user's surroundings according to the first motion status data and the second motion status data. In some embodiments, the augmented reality server may determine relative position of the first user and the second user according to the first deflection angle of the head of the first user in the preset reference coordinate system and the second deflection angle of the head of the second user in the preset reference coordinate system. Then, the augmented reality server can adjust the angle of the facial image of the first user disposed in the image of the second user's surroundings in real time according to the relative position. Therefore, when the first user or the second user turns his/her head so that the image of the second user's surroundings would change, the facial image of the first user may also change in real time according to the relative position of the two users, so that the augmented reality image seen by the second user is closer to a real scene, which improves the user's sense of immersion. Reference can be made to an image superposition algorithm in relevant technologies for the specific process for adjusting the angle of the facial image of the first user disposed in the image of the second user's surroundings according to the relative position of the first user and the second user, which will not be discussed herein.

It shall be explained that the sequence of the steps of the image processing methods according to some embodiments can be adjusted as appropriate, and the steps may also be added or removed according to the circumstances. Those ordinarily skilled in the art can envisage other variations of the methods according to the embodiments described in detail in the description, and all the variations shall be included within the protection scope of the present invention, which will not be discussed herein.

In summary, there is provided an image processing method according to some embodiments. The augmented reality server can receive the facial image of the first user sent by the first augmented reality apparatus, and conduct augmented reality processing on the image of the second user's surroundings sent by the second augmented reality apparatus according to the facial image of the first user. Therefore, it is more flexible for the augmented reality server to conduct augmented reality processing on images, resulting in a better processing effect, improving user experience and enhancing the sense of immersion for the user.

Figure 5A:
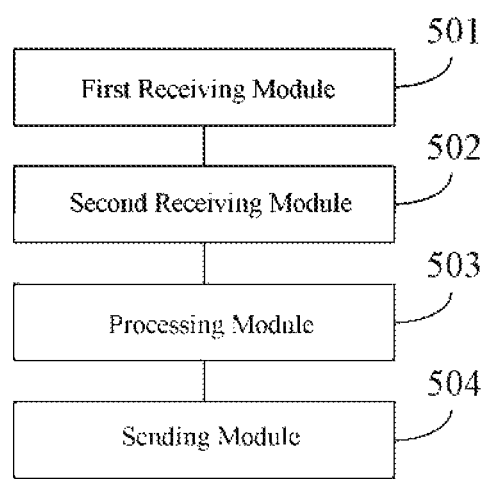
FIG. 5A is a structural schematic view of an image processing device according to an embodiment.

FIG. 5A is a structural schematic view of an image processing device according to an embodiment. The image processing device may be used in an augmented reality server. As shown in FIG. 5A, the image processing device comprises a first receiving module 501, a second receiving module 502, a processing module 503 and a sending module 504. The first receiving module 501 can receive a facial image of a first user sent by a first augmented reality apparatus. The second receiving module 502 can receive an image of a second user's surroundings sent by a second augmented reality apparatus, and the first user and the second user are located in the same reality scene. The processing module 503 can conduct augmented reality processing on the image of the second user's surroundings according to the facial image of the first user. The sending module 504 can send the processed image of the second user's surroundings to the second augmented reality apparatus.

In summary, there is provided an image processing device according to some embodiments, and the image processing device is located in the augmented reality server. The image processing device can receive, via a first receiving module, a facial image of a first user sent by a first augmented reality apparatus, and conduct augmented reality processing on the image of the second user's surroundings sent by the second augmented reality apparatus, by a processing module according to the facial image of the first user. It is more flexible for the image processing device to conduct augmented reality processing on images, thereby achieving a better processing effect.

Figure 5B:
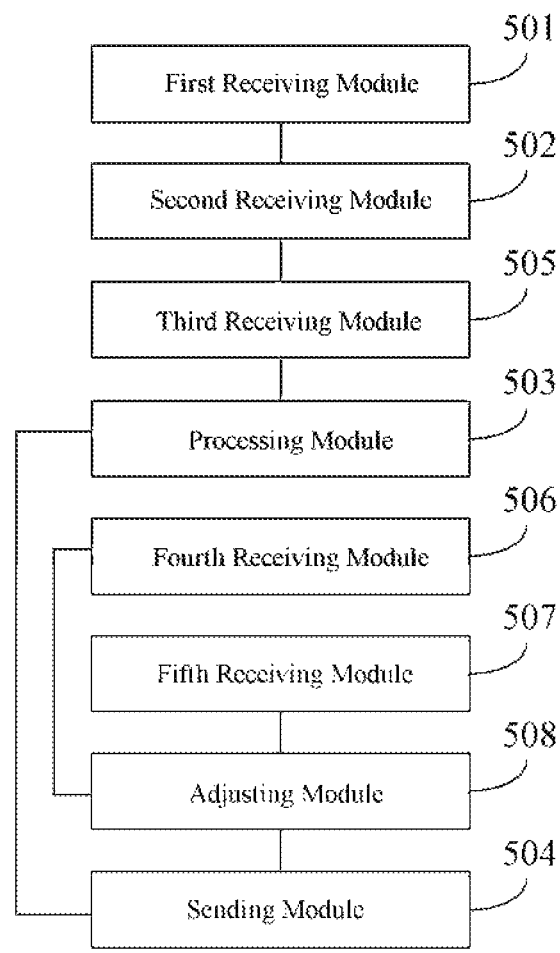
FIG. 5B is a structural schematic view of another image processing device according to an embodiment.

FIG. 5B is a structural schematic view of another image processing device according to an embodiment. The image processing device may be used in an augmented reality server. As shown in FIG. 5B, the image processing device comprises a first receiving module 501, a second receiving module 502, a processing module 503, a sending module 504, a third receiving module 505, a fourth receiving module 506, a fifth receiving module 507 and an adjusting module 508. The first receiving module 501 can receive a facial image of a first user sent by a first augmented reality apparatus. The second receiving module 502 can receive an image of a second user's surroundings sent by a second augmented reality apparatus, and the first user and the second user are located in the same reality scene. The processing module 503 can conduct augmented reality processing on the image of the second user's surroundings according to the facial image of the first user. The sending module 504 can send the processed image of the second user's surroundings to the second augmented reality apparatus. The third receiving module 505 can receive positional information sent by the second augmented reality apparatus and the identification of the first augmented reality apparatus corresponding to the positional information, and the positional information is used for indicating the position of the first augmented reality apparatus in the image of the second user's surroundings. The fourth receiving module 506 can receive first motion status data of the head of the first user sent by the first augmented reality apparatus. The fifth receiving module 507 can receive second motion status data of the head of the second user sent by the second augmented reality apparatus. The adjusting module 508 can adjust the angle of the facial image of the first user disposed in the image of the second user's surroundings according to the first motion status data and the second motion status data.

Figure 5C:
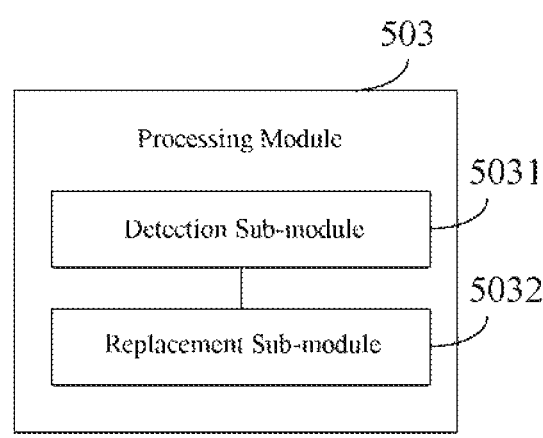
FIG. 5C is a structural schematic view of a processing module according to an embodiment.

FIG. 5C is a structural schematic view of a processing module according to an embodiment. As shown in FIG. 5C, the processing module 503 may comprise a detection sub-module 5031 and a replacement sub-module 5032. The detection sub-module 5031 can detect whether an image of the first augmented reality apparatus exists in the image of the second user's surroundings. The replacement sub-module 5032 can replace the image of the first augmented reality apparatus with the facial image of the first user when the image of the first augmented reality apparatus exists in the image of the second user's surroundings.

The detection sub-module 5031 can also detect whether, in the image of the second user's surroundings, the image of the augmented reality apparatus exists in the position indicated by the positional information. When, in the image of the second user's surroundings, the image of the augmented reality apparatus exists in the position indicated by the positional information, the detection sub-module 5031 can determine that the image of the augmented reality apparatus in the position indicated by the positional information is the image of the first augmented reality apparatus according to the identification of the first augmented reality apparatus.

In an embodiment, the apparatus body of the first augmented reality apparatus may be provided with an identification pattern for indicating the first augmented reality apparatus. The detection sub-module 5031 can detect whether an image of the augmented reality apparatus exists in the image of the second user's surroundings. When the image of the augmented reality apparatus exists in the image of the second user's surroundings, the detection sub-module 5031 detects whether there is the identification pattern in the image of the augmented reality apparatus. When there is the identification pattern in the image of the augmented reality apparatus, the detection sub-module 5031 determines that the image of the augmented reality apparatus is the image of the first augmented reality apparatus.

In an embodiment, the first motion status data comprises a deflection angle of the head of the first user in a preset reference coordinate system. The adjustment module 507 can adjust the angle of the facial image of the first user disposed in the image of the second user's surroundings according to the deflection angle.

As discussed above with reference to FIG. 4, when the image processing device receives two deflection angles of the heads of two users in the preset reference coordinate system from two augmented reality apparatuses respectively, the adjusting module 507 can determine the relative position of the two users according to the two deflection angles. Later, the adjusting module 507 adjusts the angle of the facial image of any user in the image of another user's surroundings in real time according to the relative position. Thus, when one user turns his/her head and the image of the other user's surroundings changes, the facial image of the one user may also change in real time according to the relative position of the two users, such that the augmented reality image seen by the other user is closer to the real scene, which improves the sense of immersion of the users. Reference can be made to the image superposition algorithm in relevant technologies for specifically adjusting the angle of the facial image of one user in the image of another user's surroundings according to the relative position of the two users, which will not be discussed herein.

In summary, there is provided an image processing device according to some embodiments, and the image processing device may be located in the augmented reality server. The image processing device can receive via a first receiving module a facial image of a first user sent by a first augmented reality apparatus, and conduct augmented reality processing on the image of the second user's surroundings sent by the second augmented reality apparatus, according to the facial image of the first user by a processing module. It is more flexible for the image processing device to conduct augmented reality processing on images, thereby achieving a better processing effect.

There is provided another augmented reality system according to some embodiments. As shown in FIG. 1, the system may comprise an augmented reality server 10 and at least two augmented reality apparatuses. The at least two augmented reality apparatuses may comprise a first augmented reality apparatus 20 and a second augmented reality apparatus 30, which may be the augmented reality apparatus(es) shown in FIG. 2A and/or FIG. 2B.

The first augmented reality apparatus 20 can acquire a facial image of a first user, and send the facial image of the first user to the augmented reality server. That is, the first augmented reality apparatus can achieve the function shown in Step 401.

The second augmented reality apparatus 30 can acquire an image of a second user's surroundings, and send the image of the second user's surroundings to the augmented reality server, wherein the first user and the second user are located in the same real scene. Namely, the second augmented reality apparatus 30 may achieve the function shown in Step 402.

The augmented reality server 10 can receive the facial image of the first user and the image of the second user's surroundings, conduct augmented reality processing on the image of the second user's surroundings according to the facial image of the first user, and send the processed image of the second user's surroundings to the second augmented reality apparatus 30. Namely, the augmented reality server 10 can achieve the functions shown in Steps 403 to 405.

In an embodiment, with reference to Steps 403 and 404 above, the augmented reality server 10 can detect whether an image of the first augmented reality apparatus exists in the image of the second user's surroundings, and replace the image of the first augmented reality apparatus with the facial image of the first user when the image of the first augmented reality apparatus exists in the image of the second user's surroundings.

In an embodiment, the first augmented reality apparatus 20 may also send a calibration signal for indicating the first augmented reality apparatus.

With reference to FIG. 2B, a calibration device (e.g., an infrared transmitter) may be disposed on the outside of the apparatus body of the first augmented reality apparatus. The calibration signal sent by the first augmented reality apparatus through the calibration device may be modulated with an identification of the first augmented reality apparatus, so that other augmented reality apparatus can identify the first augmented reality apparatus according to the calibration signal.

When detecting the calibration signal, the second augmented reality apparatus 30 may also obtain the positional information of the first augmented reality apparatus in the image of the second user's surroundings according to the calibration signal, and send the positional information and the identification of the first augmented reality apparatus corresponding to the positional information to the augmented reality server. Namely, the second augmented reality apparatus 30 can achieve the function shown in Step 4031a.

The augmented reality server 10 may also detect whether, in the image of the second user's surroundings, the image of the augmented reality apparatus exists in the position indicated by the positional information. When, in the image of the second user's surroundings, the image of the augmented reality apparatus exists in the position indicated by the positional information, the augmented reality server 10 can determine the image of the augmented reality apparatus in the position indicated by the positional information is the image of the first augmented reality apparatus according to the identification of the first augmented reality apparatus. Namely, the augmented reality server 10 can achieve the functions shown in Steps 4032a and 4033a.

In an embodiment, as shown in FIG. 2B, the apparatus body of the first augmented reality apparatus 20 may also be provided with an identification pattern for indicating the first augmented reality apparatus 20.

The augmented reality server 10 may detect whether the image of the augmented reality apparatus exists in the image of the second user's surroundings. When the image of the augmented reality apparatus exists in the image of the second user's surroundings, the augmented reality server 10 detects whether there is the identification pattern in the image of the augmented reality apparatus. When there is the identification pattern in the image of the augmented reality apparatus, the augmented reality server 10 determines that the image of the augmented reality apparatus is the image of the first augmented reality apparatus. Namely, the augmented reality server 10 may also achieve the functions shown in Steps 4031b to 4033b.

In an embodiment, the first augmented reality apparatus 20 may also acquire first motion status data of the head of the first user, and send the first motion status data to the augmented reality server 10. The first augmented reality apparatus 20 may also achieve the function shown in Step 406.

The second augmented reality apparatus 30 may also acquire second motion status data of the head of the second user, and send the second motion status data to the augmented reality server 10. Namely, the second augmented reality apparatus 30 may also achieve the function shown in Step 407.

The augmented reality server 10 may also adjust the angle of the facial image of the first user disposed in the image of the second user's surroundings according to the first motion status data and the second motion status data. Namely, the augmented reality server 10 may also achieve the function shown in Step 408.

In an embodiment, the first motion status data comprises a first deflection angle of the head of the first user in a preset reference coordinate system, the second motion status data comprises a second deflection angle of the head of the second user in the preset reference coordinate system. The augmented reality server 10 can adjust the angle of the facial image of the first user disposed in the image of the second user's surroundings according to the first deflection angle and the second deflection angle.

In summary, there is provided an augmented reality system according to some embodiments. The augmented reality system comprises an augmented reality server and at least two augmented reality apparatuses, the at least two augmented reality apparatuses comprising a first augmented reality apparatus and a second augmented reality apparatus. The first augmented reality apparatus can acquire a facial image of a first user, in addition to an image of a first user's surroundings. The augmented reality server can receive the facial image of the first user, and conduct augmented reality processing on an image of a second user's surroundings sent by a second augmented reality apparatus, according to the facial image of the first user, thereby enriching the functions of the first augmented reality apparatus, and enhancing the flexibility in augmented reality processing of images by the augmented reality server.

Those ordinarily skilled in the art can clearly know that for the specific operating process of the system, device and modules as stated above, reference can be made to the corresponding process described in the method embodiments, which will not be discussed herein for the sake of easy and concise description.

It can be understood that the above embodiments are only exemplary embodiments, but not intended to limit the present invention. Those skilled in the art can conceive of various changes or replacements according to the embodiments described in detail herein. Any changes or replacements shall be included in the protection scope of the present invention. Thus, the protection scope of the present invention shall be determined based on the protection scope of the appended claims.

It needs to be explained that the above embodiments are only illustrated by way of the above individual function module division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the plurality of modules can be integrated into one module.

The term "and/or" used herein is only used to describe the connecting relations between objects connected thereby, which may be of three types. For instance, "A and/or B" can represent the following three situations: A alone, or B alone, or both A and B. In addition, the character "/" used herein generally indicates that the former and the latter objects connected thereby is in a "or" relationship.

The present application uses such wordings as "first", "second" and "third". Unless specified in the context, such wordings do not imply an order, but are actually used only for the purpose of identification. For instance, the phrases "a first augmented reality apparatus" and "a second augmented reality apparatus" do not necessarily mean the first augmented reality apparatus is in front of the second augmented reality apparatus in an ordering or a priority. In fact, these phrases are only used to identify different augmented reality apparatuses.

In the claims, any reference sign in parentheses should not be interpreted as a limitation to the claims. The term "comprise/include" does not exclude the presence of elements or steps other than those listed in the claims. The present invention may be implemented by hardware comprising a plurality of separate elements, or by properly programmed software or firmware, or by any combination thereof.

In device or system claims that enumerate several means, one or more of the means can be embodied in one and the same item of hardware. The mere fact that some measures are recited in dependent claims that are different from each other does not indicate that the combination of the measures cannot be used to advantage.

What is claimed is:

1. An augmented reality system comprising:
an augmented reality server and at least two augmented reality apparatuses, wherein the at least two augmented reality apparatuses comprise a first augmented reality apparatus and a second augmented reality apparatus,
wherein the first augmented reality apparatus comprises
an apparatus body wearable by a first user;
a facial image acquiring component disposed on the inside of the apparatus body, wherein when the apparatus body is worn by the first user, the facial image acquiring component is oriented towards the face of the first user and at a preset distance from the face of the first user, the facial image acquiring component is configured to acquire a facial image of the first user; and
a first communication module connected with the facial image acquiring component and configured to send the facial image to the augmented reality server,
wherein the second augmented reality apparatus comprises
an apparatus body wearable by a second user;
a surrounding image acquiring component disposed on the outside of the apparatus body and configured to acquire an image of the second user's surroundings; and
a second communication module connected with the surrounding image acquiring component and configured to send the image of the second user's surroundings to the augmented reality server, the first user and the second user being located in a same reality scene,
wherein the augmented reality server comprises
a receiving module configured to receive the facial image of the first user and the image of the second user's surroundings;
a processing module configured to conduct augmented reality processing on the image of the second user's surroundings according to the facial image of the first user; and
a sending module configured to send the processed image of the second user's surroundings to the second augmented reality apparatus;
wherein the first augmented reality apparatus further comprises a calibration device disposed on the outside of the apparatus body and configured to send a calibration signal for indicating the first augmented reality apparatus,
wherein the surrounding image acquiring component of the second augmented reality apparatus is further configured to detect the calibration signal and, determine, according to the calibration signal, an identification of the first augmented reality apparatus and obtain positional information of the first augmented reality apparatus in the image of the second user's surroundings, and the second communication module is configured to send the positional information and the identification of the first augmented reality apparatus corresponding to the positional information to the augmented reality server.

2. The system according to claim 1, wherein the augmented reality server further comprises:
a detection sub-module configured to detect whether an image of the first augmented reality apparatus exists in the image of the second user's surroundings; and
a replacement sub-module configured to replace the image of the first augmented reality apparatus with the facial image of the first user, when the image of the first augmented reality apparatus exists in the image of the second user's surroundings.

3. The system according to claim 2,
wherein the detection sub-module is further configured to
detect whether, in the image of the second user's surroundings, the image of the augmented reality apparatus exists in the position indicated by the positional information; and
determine that the image of the augmented reality apparatus in the position indicated by the positional information is the image of the first augmented reality apparatus according to the identification of the first augmented reality apparatus, when, in the image of the second user's surroundings, the image of the augmented reality apparatus exists in the position indicated by the positional information.

4. The system according to claim 2, wherein the apparatus body of the first augmented reality apparatus is provided with an identification pattern for indicating the first augmented reality apparatus,
wherein the detection sub-module is further configured to
detect whether an image of the augmented reality apparatus exists in the image of the second user's surroundings;
detect whether there is the identification pattern in the image of the augmented reality apparatus, when the image of the augmented reality apparatus exists in the image of the second user's surroundings; and
determine that the image of the augmented reality apparatus is the image of the first augmented reality apparatus, when there is the identification pattern in the image of the augmented reality apparatus.

5. The system according to claim 2, wherein the first augmented reality apparatus further comprises a first motion sensor configured to acquire first motion status data of the head of the first user,
the first communication module is further configured to send the first motion status data to the augmented reality server,
the second augmented reality apparatus further comprises a second motion sensor configured to acquire second motion status data of the head of the second user,
the second communication module is further configured to send the second motion status data to the augmented reality server, and
the augmented reality server further comprises an adjustment module configured to adjust an angle of the facial image of the first user disposed in the image of the second user's surroundings according to the first motion status data and the second motion status data.

6. The system according to claim 5,
wherein the first motion status data comprises a first deflection angle of the head of the first user in a preset reference coordinate system, the second motion status data comprises a second deflection angle of the head of the second user in the preset reference coordinate system;
wherein the adjustment module is configured to adjust the angle of the facial image of the first user disposed in the image of the second user's surroundings according to the first deflection angle and the second deflection angle.

7. An augmented reality apparatus, comprising:
an apparatus body wearable by a user;
a facial image acquiring component disposed on the inside of the apparatus body, wherein when the apparatus body is worn by the user, the facial image acquiring component is oriented towards the face of the user and at a preset distance from the face of the user, the facial image acquiring component is configured to acquire a facial image of the user;
a surrounding image acquiring component configured to acquire an image of the user's surroundings; and
a communication module connected with the facial image acquiring component and configured to send the facial image to the augmented reality server; and
wherein the surrounding image acquiring component is further configured to detect a calibration signal sent by other augmented reality apparatus when acquiring the image of the user's surroundings, and determine, according to the detected calibration signal, an identification of the other augmented reality apparatus and obtain positional information of the other augmented reality apparatus in the image of the user's surroundings; and
wherein the communication module is further configured to send the positional information and the identification of the other augmented reality apparatus corresponding to the positional information to the augmented reality server.

8. The apparatus according to claim 7, wherein the apparatus further comprises
a calibration device disposed on the outside of the apparatus body and configured to send a calibration signal for indicating the augmented reality apparatus.

9. The apparatus according to claim 8, wherein the calibration device comprises an infrared transmitter.

10. The apparatus according to claim 7, wherein the surrounding image acquiring component is disposed on the outside of the apparatus body; and the communication module is connected with the surrounding image acquiring component and further configured to send the image of the user's surroundings to the augmented reality server.

11. The apparatus according to claim 7, wherein the apparatus further comprises:
a motion sensor configured to acquire motion status data of the head of the user; and
wherein the communication module is connected with the motion sensor and further configured to send the motion status data to the augmented reality server.

12. The apparatus according to claim 11, wherein the motion sensor comprises a six-axis sensor.

13. The apparatus according to claim 7, wherein the apparatus body is provided with an identification pattern for indicating the augmented reality apparatus.

14. The apparatus according to claim 7, wherein the facial image acquiring component comprises a wide-angle camera.

15. The apparatus according to claim 7, wherein the apparatus body comprises glasses or a helmet.

* * * * *